United States Patent
Rothman et al.

(10) Patent No.: US 7,228,405 B2
(45) Date of Patent: *Jun. 5, 2007

(54) METHODS AND APPARATUSES FOR ALLOWING USERS TO DYNAMICALLY INTERACT WITH CONFIGURABLE DEVICES OR HARDWARE DURING A PREBOOT STAGE

(75) Inventors: Michael A. Rothman, Gig Harbor, WA (US); Greg McGrath, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 477 days.

This patent is subject to a terminal disclaimer.

(21) Appl. No.: 10/180,153

(22) Filed: Jun. 25, 2002

(65) Prior Publication Data

US 2003/0236971 A1    Dec. 25, 2003

(51) Int. Cl.
*G06F 15/177* (2006.01)
*G06F 17/00* (2006.01)

(52) U.S. Cl. .............. 713/1; 713/2; 715/735
(58) Field of Classification Search ............ 713/1, 713/2, 100; 710/8, 9, 10; 715/735; 700/17, 700/83
See application file for complete search history.

(56) References Cited

U.S. PATENT DOCUMENTS

| | | | | |
|---|---|---|---|---|
| 5,822,565 A | * | 10/1998 | DeRosa et al. | 703/24 |
| 5,825,361 A | * | 10/1998 | Rubin et al. | 715/839 |
| 5,838,907 A | * | 11/1998 | Hansen | 709/220 |
| 5,951,687 A | * | 9/1999 | Chan et al. | 713/2 |
| 6,139,177 A | * | 10/2000 | Venkatraman et al. | 700/83 |
| 6,380,687 B1 | * | 4/2002 | Yamazaki | 315/169.3 |
| 6,513,114 B1 | * | 1/2003 | Wu et al. | 713/2 |
| 6,560,641 B1 | * | 5/2003 | Powderly et al. | 709/219 |
| 6,760,755 B1 | * | 7/2004 | Brackett | 709/214 |
| 2002/0174209 A1 | * | 11/2002 | Sesek et al. | 709/223 |

FOREIGN PATENT DOCUMENTS

JP    11163815 A  *  6/1999

OTHER PUBLICATIONS

IBM, System Configuration for a Multiple Node Computer System, Sep. 1, 1984, vol. 27, Issue 4B, pp. 2541-2546.*

* cited by examiner

*Primary Examiner*—Thomas Lee
*Assistant Examiner*—Suresh K Suryawanshi
(74) *Attorney, Agent, or Firm*—Racheol Wu

(57) ABSTRACT

Methods and apparatuses of configuring a computer system. During a runtime stage or a preboot stage, a device driver for a configurable device exports a set of the configuration information that is resident the buffer during the preboot stage of the computer system. The configuration information is retrieved. The configuration information for said configurable device includes information enabling a callback operation, which allows an operator to dynamically interact with said configurable device. A homepage including a configuration menu for said configurable device is generated and presented to the operator to make configuration selections. The homepage is generated based on the information contained in the buffer. The configuration selections are communicated to the device driver. The configuration selections for said configurable device in a nonvolatile storage module included within said computer system.

22 Claims, 8 Drawing Sheets

METHODS AND APPARATUSES FOR ALLOWING USERS TO DYNAMICALLY INTERACT WITH CONFIGURABLE DEVICES OR HARDWARE DURING A PREBOOT STAGE

FIELD

Some embodiments of the invention relate generally to the field of machine firmware configuration and, more specifically, to uniform configuration of the machine's firmware and to dynamic interaction between a user and the machine's firmware during a configuration session.

BACKGROUND

When a machine such as a computer system is turned on, the machine and the configurable devices in the machine are configured. The manners in which these various routines are carried out depend on the particular configuration of the computer system or the various configurable devices in the computer system. For instance, a configuration setup dictates whether the computer system will perform an exhaustive memory test or a brief memory test prior to boot up (computer system is turned on and is in ready stage). In another example, the configuration setup for the computer system dictates whether to boot the computer system up from a hard drive, a floppy, or a CD ROM installed in the computer system.

Generally, a user's ability to configure the computer system or any hardware devices (video cards, network cards, etc.) present in the computer system is restricted to the preboot stage. As more and more hardware for computer systems are being developed with configuration options presented to the user, and the flexibility as to when configuration can occur, hardware manufacturers have been creating two different drivers (e.g., routines) that are installed in the particular hardware that enable the user to configure the hardware when the computer system is in the preboot stage as well as in the boot up stage. One driver is created to enable configuration during preboot stage; and another driver is created to enable configuration during boot up stage. However, a computer system is often equipped with a particular operating system (e.g., Macintosh OS, DOS, Windows, Windows NT, and UNIX) that runs the computer system during post-boot operation, also referred to as runtime. The runtime stage refers to the stage when the computer system's operating system has control after the boot up stage and runs the computer system. The runtime stage can be also referred to as the post-boot stage. To enable configuration of any device in the boot up stage, the additional second drivers must be written to communicate with the particular operating system. The existence of many different operating systems forces the manufacturers to develop several different drivers to accommodate these different operating systems. The making of the devices are thus unnecessarily expensive and complex.

Additionally, a conventional configuration infrastructure uses data exported to the devices to set up the devices. The set up is actuated when the computer system is reset or reboot after which the newly set configurations will take place. Generally, the configuration data is saved into the NVRAM which will act as a proxy to effectuate the changes such that when the system is reset, the drivers dedicated to control the particular hardware will go to that NVRAM to gather the necessary configuration information to enact the changes to the devices. Current configuration infrastructure lacks the ability to allow users to dynamically interact with configurable devices or hardware other than through some nonvolatile storage device that stores the configuration data.

BRIEF DESCRIPTION OF THE DRAWINGS

The invention may best be understood by referring to the following description and accompanying drawings that are used to illustrate embodiments of the invention. The accompanying drawings of various embodiments of the invention are not to be taken as limiting the invention to the specific embodiments, but are for explanation and understanding only. In the drawings:

FIG. 4 illustrates a computer system that a uniform configuration mechanism with dynamic interaction can be applied to.

DETAILED DESCRIPTION

In the following description, numerous specific details are set forth. In the following description, numerous specific details are set forth. However, it is understood that embodiments of the invention may be practiced without these specific details. In other instances, well-known circuits, structures and techniques have not been shown in detail in order not to obscure the understanding of this description.

The embodiments of the invention also relate to an apparatus (e.g. an application routine or device having an application routine) for performing the operations herein. This apparatus may be specially constructed for the required specific purposes, or it may comprise a general-purpose computer selectively activated or reconfigured by a computer program stored in the computer. Such a computer program may be stored in a computer readable storage medium.

For the purposes of this discussion, the term "machine-readable medium" shall be taken to include any medium that is capable of storing or encoding a sequence of instructions for execution by a machine such as a computer and that cause the machine to perform any one of the methodologies of the embodiments. The term "machine-readable medium" shall accordingly be taken to include, but not be limited to, solid-state memories, read only memories (ROMs) random access memories (RAMs), erasable programmable ROM (EPROMs), electrically erasable programmable ROM (EEPROMs) magnetic or optical cards, optical and magnetic disks, (e.g., floppy disks, compact disc ROM (CD-ROMS), and digital video disc (DVD-ROMS)) magnetic-optical disks, and carrier wave signals, or any type of media suitable for storing electronic instructions and data. A machine-readable medium can also be a computer-readable medium that is coupled to a computer system bus present in the computer.

Figure 4:
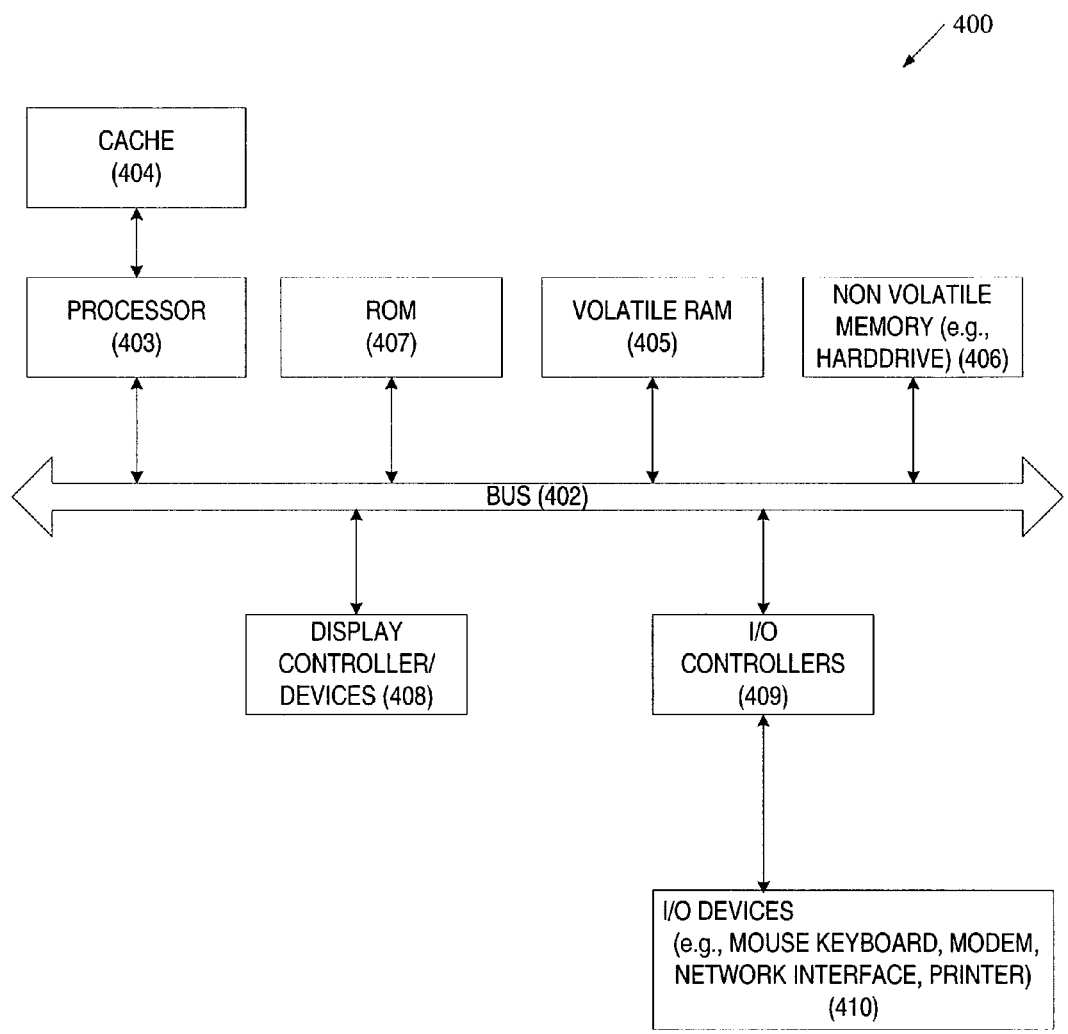

FIG. 4 illustrates one example of a typical system 400 that will benefit from some of the exemplary embodiments of the present invention. Note that while FIG. 4 illustrates various components of a computer system, it is not intended to represent any particular architecture or manner of interconnecting the components, as such details are not germane to this discussion. It will also be appreciated that the network computers and other data processing systems, which have fewer components or perhaps more components, may also be used. The system 400 of FIG. 4 may, for example, be a computer system such as an Apple Macintosh or an IBM-compatible computer commonly referred to as personal computers (PC's). The system 400 is further described in detail at the end of this discussion.

Some of the exemplary embodiments below describe methods and apparatuses for a novel mechanism that allows for configuration of a computer system's firmware (e.g., ROM, PROM, EPROM, EEPROM, and other memory chips capable of holding contents without electrical power) irrespective of whether the computer system is in a preboot or booting up stage or in runtime stage. The exemplary embodiments further provide a user with the ability to configure the traditional motherboard system setup and any configurable devices such as option cards, network cards, RAID (Redundant Array of Inexpensive Disks) controller, etc . . . , in a uniform manner. The term configurable devices indicates that the devices can be added to the computer system and the drivers for the devices invite or allow the user to configure the setup of the devices if the user desires to. The exemplary embodiments further provide the user with the ability to dynamically interact with the configurable devices during configuration set up, whether the configuration set up is in the preboot stage/booting up stage or in the runtime stage. The term dynamic interaction indicates that the user can directly and immediately interact with the configurable devices (through their dedicated drivers) during a configuration session. When the user interacts dynamically with the configurable devices to enact configuration set up or changes, the user will see the changes or the selections taking effect immediately, or almost immediately, without needing to reboot or reset the computer system or its operating system.

The term uniform manner indicates that configuration for the computer system and any configurable devices populating the computer system will be the same whether the computer system is in the preboot stage/booting up stage or in the runtime stage. Uniform configuration enables the user to configure the configurable devices with the same user interface and in the same manner whether the user chooses to configure during the preboot stage or during the runtime stage. The term "uniform manner" also signifies that the utility has the traditional interface and the possibilities peculiar to a conventional setup program (e.g., conventional BIOS (Basic Input/Output System) setup program). The preboot or the booting up stage refers to the stage when the computer system is first turned on with all devices being initiated. The preboot stage or the booting up stage occurs prior to the completion of all of the necessary testing of the computer system and when the computer system's operating system (e.g., Windows) is started. For example, during the preboot stage, the BIOS for the computer system typically enables the computer system to communicate with and test various devices to allow configuration of the devices that are connected to the computer system. When all configuration and testing is completed, the operating system will take over the control of the computer system.

In one exemplary embodiment, during a runtime stage for the computer system, configuration data for the configurable devices populating the computer system are retrieved from a buffer that is generated when the computer system is turned on. The configuration data includes all of the set up information for any particular configurable device. The configuration data typically includes configuration set up questions and configuration setup answer choices for the user to make user selections. The configuration data for the configurable devices is transferred to this buffer during the preboot stage of the computer system. The buffer is persistent into the runtime stage of the computer system.

Additionally, during the preboot stage, a homepage for the configuration data is generated based on the buffer, which is created during the preboot stage and is continuously being updated as necessary. The homepage comprises a configuration menu for each of the configurable devices. The homepage is presented to an operator or a user for configuration setup for each of the configurable devices at the user's request. The configuration menu includes available configuration features for each configurable device. The configuration menu includes question and response types of entries for each configuration feature to enable the user to make configuration selections. These question and response types of entries in the configuration menu for each of the configurable devices are linked to a plurality of operational codes each of which pertains to a configuration feature for a particular configurable device. Any or many of the operational code includes an identifier, which indicates that the particular operational code involves a callback operation that will allow the user to configure the particular device dynamically. During any one configuration session, the callback operation is a feature of the configurable device that will allow the user's configuration selections to be directly delivered to the driver associated with that device. The driver will then immediately execute such selections. The callback operation feature may be a set of instructions programmed or installed in the driver. These instructions indicate how and when the configuration selections are immediately relayed to the device.

In one exemplary embodiment, the user may request configuration during the preboot stage or during the runtime stage. The request during the preboot stage may be made, for example, through some command such as by hitting a function key on the keyboard. The request during the runtime stage may be made by the user executing some program represented by an icon in a control panel to initiate runtime configuration. The user may select the appropriate or desirable configuration setup. The data for this configuration setup is then stored in a nonvolatile storage module, which is included within the computer system.

In another exemplary embodiment, during the preboot stage, the configuration data for each of the configurable devices is exported and collected into various buffer locations. This configuration data may be the configuration setup that was previously selected by the user or the default setup for each device. The configuration data is then organized into one unified buffer. The unified buffer can be the same buffer from where the configuration data for configurable devices is retrieved during the runtime stage configuration mentioned above. The configuration data for each configurable device is allocated a predetermined space in the unified buffer. An indication for the location of the unified buffer is created. For example, a unique identifier for the unified buffer is installed to indicate the location of the unified buffer. Additionally, a point pair is also installed to indicate a starting point for the unified buffer. The starting point indicates information as to where the configuration setup begins for each of the configurable devices.

For the preboot stage configuration, the homepage is presented to the user during the preboot stage. For the runtime stage configuration, the homepage is read from a buffer by a set of instructions residing in the computer system's operating system and is presented to the user during the runtime stage using the operating system's interface. The user performs configuration selection essentially in the same manner whether the computer system is the runtime or in the preboot stage. In the case where the call back operation is performed, the user will see the changes to the device as the configuration selections are sent to the device.

The computer system such as that described in FIG. 4 having a memory for storing instructions can be used to perform the exemplary embodiments of this discussion. Additionally, a machine-readable medium or a computer-readable medium for storing instructions that can be coupled to the computer system can also be used. When the instructions are executed on the processor, they cause the processor to perform functions that carry out the exemplary embodiments of this discussion.

Figure 1A:
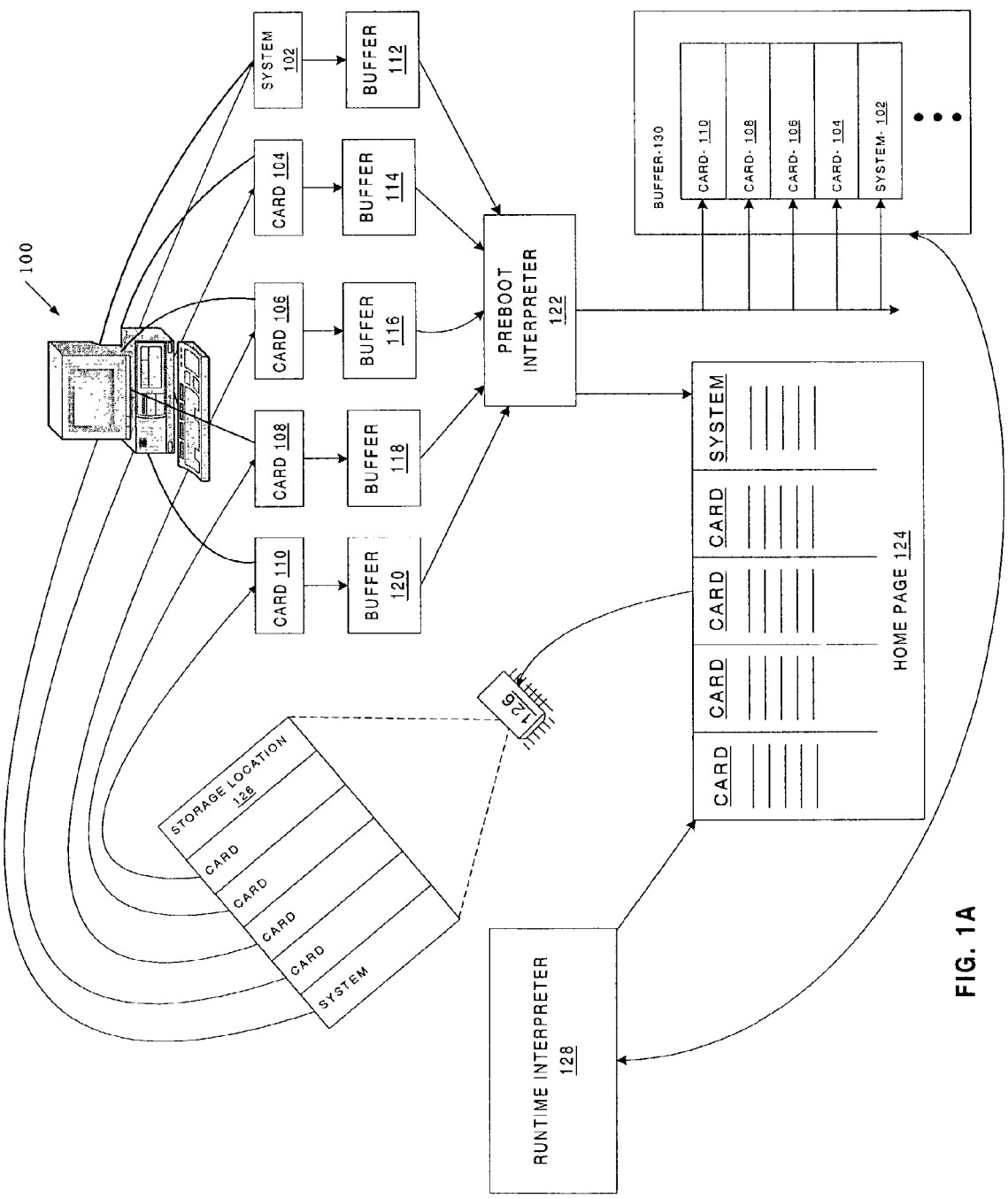
FIG. 1A illustrates an exemplary embodiment of a mechanism that enables uniform configuration for both the preboot stage and the runtime stage.

FIG. 1A illustrates an exemplary embodiment of a computer system that has a mechanism that enables it to configure the system and any other configurable devices populating the system whether the system is in the preboot stage or in the runtime stage. The computer system of this exemplary embodiment further enables a dynamic configuration environment through the callback operation in which the user can make configuration changes and immediately able to experience or see the changes without having the need to reboot or reset the computer system.

The computer system 100 of FIG. 1A comprises a system motherboard 102, a card 104, a card 106, a card 108, and a card 110. Each of the cards 104, 106, 108, and 110 can be, for example, a network card interface, a Redundant Array of Independent Disks (RAID) controller card, a video card, or any other device that is configurable and addable to the computer system 100. Configurable devices refer to those devices that have setup information that the user is able to change, set, or setup. The configurable devices further have device drivers (e.g., software, instructions, or codes) that are created to invite or to enable the user to select a desirable configuration setup. The computer system 100 illustrates a system with four add-in cards, which have setup presentations in addition to the main system, which also has setup information. However, the number of the add-in cards can be increased or decreased depending on user's needs and/or on the capacity of the computer system 100.

Continuing with FIG. 1A, each of the devices, the cards 104, 106, 108, 110 or the system motherboard 102, include a plurality of questions and answers information relating to the setup for the devices. As mentioned, these questions and answers constitute the configuration for each of the cards 104, 106, 108 and 110 and the system motherboard 102. The information relating to the setup for the device is exported to a central storage place in the computer system, a unified buffer 130. The information is exported as a binary image, which encodes a set of interpretable operational codes, strings, and fonts.

The operational codes indicate the name and type of the device for which a particular set of configuration information is being exported. For example, the operation code may say, "this is the main system configuration setup." The operational codes also include identifiers, which indicate whether or not the particular operational codes are callback operations. For example, one operational code may, in essence, state that this particular configuration set up requires collecting of the user's selections and immediately communicating the selections back to the device's driver for the driver to immediately effect the changes on the configuration of the device.

The strings indicate the abstract information regarding the configuration setup for any particular device. For example, the strings may comprise of the questions and answers relating to the configuration setup. A configuration menu can be generated using the strings to show the questions to the user and accept the answers from the user's selection during a configuration process.

The fonts indicate how the configuration setup menu can be presented to the user, for instance, what kind of font, paragraph, size, appearance, and the like will be used to present the strings to the user. The fonts may dictate the appearance of the user interface used to present configuration information the user.

Still with FIG. 1A, in one embodiment, an interpreter 122, which is a set of instructions, collects all of the exported configuration data, organizes it, and copies it into a unified buffer 130 that is persistent into the runtime stage of the computer system. In one example, the interpreter 122 is also a set of instructions that initializes all of the devices in the computer system 100. The interpreter 122 may resides in a FLASH memory device in the computer system 100. A FLASH memory is well known to those of ordinary skill in the art. The interpreter 122 operates within the preboot stage to setup the unified buffer 130. The interpreter 122 can be referred to as a preboot interpreter. In another example, the unified buffer 130 created by the interpreter 122 is stored in a RAM when the computer system is on. This RAM storage enables the unified buffer 130 to be persistent into the runtime stage of the computer system. The buffer 130 is created in such a way that any known operating system that runs on the computer system 100 can locate and access the buffer 130 during the runtime phase.

In another exemplary embodiment, the information relating to the setup for each of the device is first exported to a random buffer storage prior to being collected at the unified buffer 130. For example, the configuration information for the system 102 is first exported to a buffer 112; the configuration information for card 104 is first exported to a buffer 114; the configuration information for card 106 is first exported to a buffer 116; the configuration information for card 108 is first exported to a buffer 118; and, the configuration information for card 110 is first exported to a buffer 120. In this embodiment, the interpreter 122 collects and organizes all of the configuration information from the various buffers into the unified buffer 130.

In another example, the interpreter 122 dynamically creates the unified buffer 130 as new information is being exported into the buffer. Additional setup information for additional devices of new setup information can be continuously added to the unified buffer 130. In this example, the user will have the opportunity to view the configuration setup that was chosen during the preboot stage as well as the choices for configuration changes in the configuration setup during the runtime stage.

To allow for both a runtime stage configuration and a preboot stage configuration, the unified buffer 130 must be created or resident during the preboot stage and must be persistent during the runtime stage. In one example, the interpreter 122 designates the unified buffer 130 to be preserved during the runtime phase of computer system 100. Furthermore, the interpreter 122 allocates spaces in the unified buffer 130 for the configuration data for each of the devices such as the cards 104, 106, 108, 110 or the system motherboard 102. Additionally, the preboot interpreter 122 uses the content in the buffer 130 to create the homepage 124. The homepage 124 is the user interface that is presented to the user for configuration sessions upon the user's request. Because the user sees and interacts with the same homepage 124, the configuration sessions are thus uniform irrespective of whether the user chooses to perform configuration during the preboot stage or during the runtime stage. Additionally, the homepage 124 need not be created and does not need data from external sources such as a website or a CD-ROM.

In one example, the homepage 124 is located within the unified buffer 130. In another example, the interpreter 122 places the homepage 124 in another buffer location that is also persistent during the runtime stage. The homepage 124 contains a configuration menu for each of the devices that has been exported into the unified buffer 130. Thus, when the computer system 100 only has four cards as shown in FIG. 1A, the homepage 124 contains only five configuration menus, one for each of the four cards and one for the system 102. Additionally, the interpreter 122 installs a globally unique identifier (GUID) to the buffer 130. The GUID is a unique value of about 128 bits that is assigned to identify the location of the unified buffer 130, which comprises configuration data sets for the configurable devices for the computer system 100. Additionally, another GUID value can be attached to the homepage 124 in the example where the interpreter 122 places the homepage 124 in a different buffer. The GUID value can be standardized and published so that manufacturers of the devices and developers of the drivers of the devices (drivers of the devices are instructions for the operation of the devices) can adapt the devices to work under this invented mechanism. The GUID values thus enable proper retrieval of the configuration data by properly locating the unified buffer 130. Furthermore, the interpreter 122 installs a pointer pair for each configuration data set to indicate the beginning of the place in the unified buffer 130 where the configuration data begin.

In one exemplary embodiment, as shown in FIG. 1A, the preboot interpreter or the interpreter 122 presents the homepage 124 to the user when the user indicates the user's desire to configure the computer system 100 and other devices populating the computer system 100. In one example, the user indicates the desire to configure by entering some commands during the preboot or the booting up stage. The user may hit a function key on a conventional keyboard (e.g., F1, F2, or F3) that will command the interpreter 122 to present the homepage 124 to the user for configuration setup.

In one exemplary embodiment, configuration sessions occur during the preboot stage. The homepage 124 presents to the user an interface with configuration menu for each of the configurable devices and the system motherboard that are populating the computer system (e.g., the cards 104, 106, 108, 110, and the system 102). Each item of the configuration menus associates with a particular operational code pertaining to configuration set up parameters and instructions of how to execute configuration set up parameters for that item. Each of the configuration menus contain the abstract information pertaining to the configuration setup created specifically for each of the devices. The abstract information may include questions that the user needs to answer and answer selections from which the user may pick in response to the questions. The abstract information can be strings of information that a particular device manufacturer or developer installs for that device. The abstract information may simply be the conventional configuration setup information that is currently being used in the field. Furthermore, the abstract information is presented to the user in any manner set by the manufacturer or developer of each of the devices as mentioned above. In one example, the answer selections are presented for the user to choose for each question pertaining to configuration setup. The user will choose one of the selections or choices from the configuration menu. The user may make adjustments to the motherboard system configuration, or any other configurable device through the homepage 124 that is presented by the interpreter 122. When the changes are ready to be committed, the interpreter 122 will store the configuration data to a storage location 126. The storage location 126 is preferably a non-volatile storage module or any storage module that is persistent, e.g., a non-volatile RAM.

When the configuration during the preboot or the booting up stage is completed, the configuration information that is stored in the storage location 126 can be retrieved by the devices (e.g., the cards 104, 106, 108, 110, and the motherboard 102). During the preboot stage, each corresponding driver for each of the devices will check the storage location 126 to determine what the user has selected (if anything) and setup the device accordingly. In one example, each of the drivers is responsible for enacting the selections or choices that the user made using conventional methods. The devices can thus be setup according to the user's selections using conventional methods before the computer system 100 goes into the runtime stage where the operating system controls the computer system 100.

In the example above where configuration set up occurs during the preboot stage, some or all of the configuration choices in the configuration menus presented to the user may involve a callback operation. The callback operation is defined by a set of instructions installed in the driver for the particular configurable device wherein the instructions execute a mechanism that takes the user's selections pertaining to the configuration of the device directly to the driver. The instructions may further instruct the driver to immediately enact or implement the configuration selections. Additionally, when the configuration choices involve the callback operation, the operational code associating with the particular configuration choices contains identifiers which include specific information that indicate the needs for the callback operation. For instance, the identifiers may state that these configuration choices are callback types of questions and that when the user enters the responses, the responses need to be communicated directly to the corresponding device immediately. Alternatively, the identifiers may simply flag the configuration choices as the types that need to be communicated immediately back to the corresponding devices after the user enter the user's selections. The identifiers may further include a set of instructions that instructs the preboot interpreter 122 of how to call back to the appropriate device (e.g., the card 104) to communicate the user's selections to the device. The identifier may include instructions to the effect of indicating the appropriate route to transfer the user selections to the devices. For instance, the instructions may indicate which interface has been set up for communication to the device's driver such that the configuration selections can be communicated.

In one preferred embodiment, the callback operation feature of any one particular configuration choice includes operational codes or instructions, which signify that a callback is required for additional information pertaining to that specific configuration choice. Additionally, the data pertaining to the configuration choice being presented to the user will have information embedded therein such that the preboot interpreter 122 will be able to interpret and know how to contact or "to callback" to the driver (e.g., device driver for the card 104). This embedded information describes where in memory the common buffer/interface for the callback operation will be placed (e.g., the callback operation for the card 104 will be placed in the transfer buffer 164). In one example, while the preboot interpreter 122 is interpreting the operational codes for the configuration choice for the card 104, and presenting the configuration choice for the card 104, via the user interface (e.g., through the homepage 124), to the user, the preboot interpreter 122 is keeping this embedded information around so that if the user makes a configuration selection at the user interface that involves the callback operation, the embedded information is activated and the preboot interpreter 124 will know how to perform that callback operation.

In the preferred embodiment, the callback operation can be installed in a callback interface, which is installed by the driver associated with the device (e.g., the driver 154 for the card 104). The callback interface can be placed in the transfer buffer 164, which resides in the system memory and can be an extension of the driver. When the user's configuration selections are deposited into this buffer, the driver is automatically aware of this deposition and will then take control to perform the callback operation. The driver is further configured to recognize the deposition of the configuration selections in the buffer and to retrieve the data pertaining to these configuration selections. The data typically includes the configuration selections as well as a description of why a callback was performed. The description further describes the operational codes for the callback operation that the user has acted upon. Once the driver retrieves the data, the driver will then communicate the appropriate level of information to the hardware/software that the driver controls to retrieve the necessary information. The driver is then able to take the resulting data from the hardware/software interaction and place the resulting data into the transfer buffer 164. The preboot interpreter 122 will be able to retrieve the necessary information, e.g., the new configuration setting that reflects the user's configuration selections, and present the information to the user.

Figure 1B:
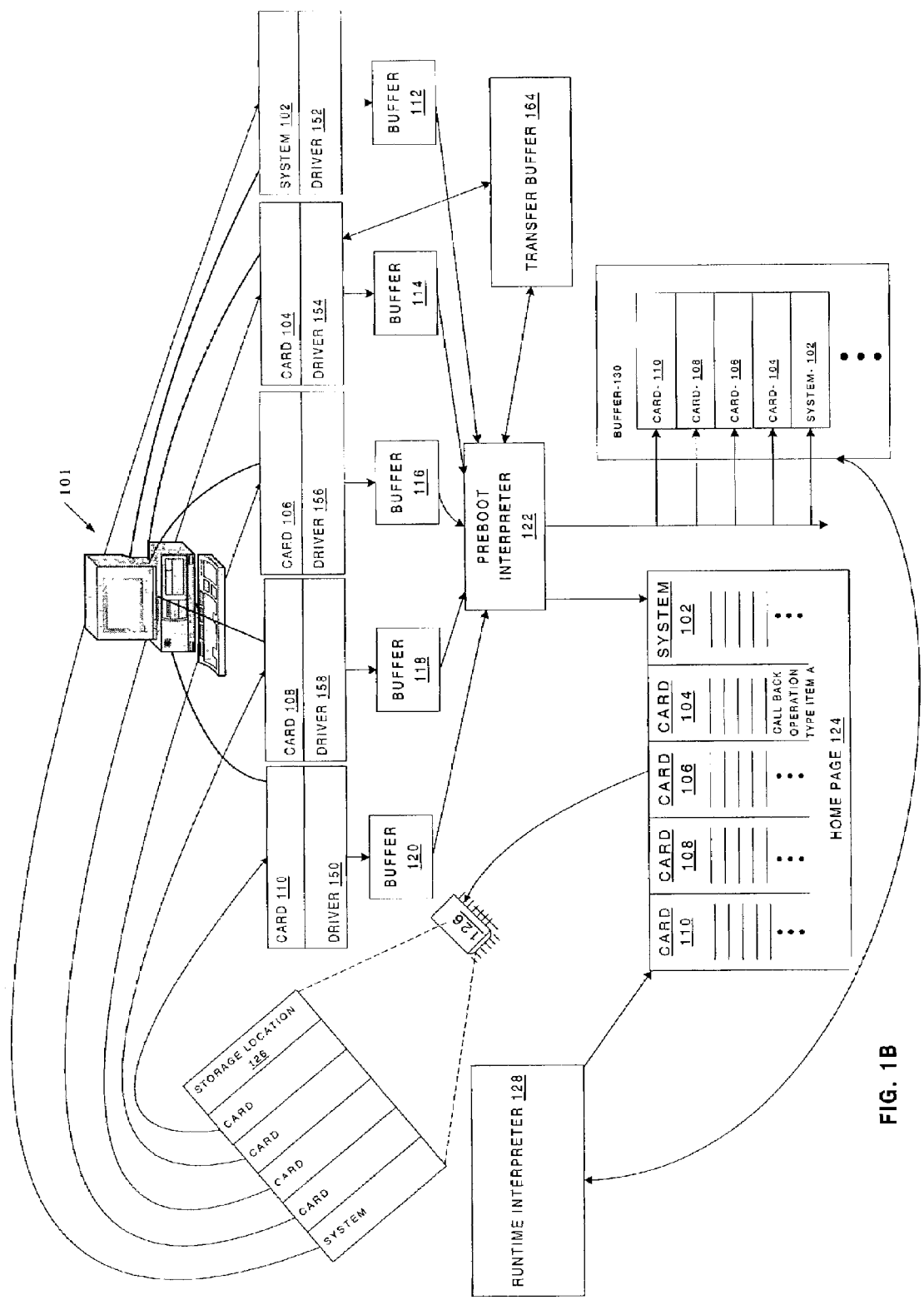
FIG. 1B illustrates an exemplary embodiment of a mechanism that enables uniform configuration while allowing the user to dynamically interact with the computer system.

FIG. 1B illustrates an exemplary scheme of configuration sessions wherein anyone of the configurable devices could be set up with the callback configuration. In this exemplary scheme, a computer system 101 is equipped with at least one device that has the callback operation installed in the driver controlling that device. The computer system 101 includes all of the components described in FIG. 1A. In addition, as shown in FIG. 1B, one of the configurable devices (e.g., the card 104) is set up with a driver (or a utility driver) 154 that is configured to perform dynamic configurations to this device.

As shown in FIG. 1B, each of the cards 104, 106, 108, 110 and the system 102 of the computer system 101 includes a driver. For instance, the system is equipped with a driver 152, the card 104 is equipped with a driver 154, for the card 106, a driver 156, for the card 108, a driver 158, and for the card 110, a driver 150. When the device is set up to include the callback operation, the device's driver includes instructions that indicate that configuration for this device involves a callback operation.

In one exemplary embodiment, the configuration session occurs during the preboot stage. Similar to FIG. 1A, the homepage 124 presents to the user an interface with configuration menu for each of the configurable device and the system motherboard that are populating the computer system (e.g., the cards 104, 106, 108, 110, and the system 102). In one example, when the user makes adjustments to the configurable device that is enabled with the callback option, (e.g., the card 104 which has the callback operation type item "A"), the preboot interpreter 122 interprets a set of callback instructions pertaining to the callback operation. (See FIG. 1B). The set of callback instructions is typically is present in the operational code associated with the configuration menu of the card 104. The preboot interpreter 122 then follows the set of instructions to perform a series of functions pertaining to the callback operation. The series of functions that the interpreter 122 performs may include collecting the user's selections and communicating the selections immediately back to the driver, and in this example, communicating the selections for the configuration selections of the card 104 back to the driver 154. Additionally, the interpreter 122 may communicate the user's selections to the driver (e.g., the driver 154) through a particular transfer buffer 164 that is dedicated to performing the transfer of data during the callback operation.

In another example, the preboot interpreter 122 communicates the user's selections to the driver in a predetermined format that the driver will recognize. Because configuration set up for the configurable device may involve several configuration features, the predetermine format need to include an identification of a particular configuration set up feature that the user has chosen to change or to submit selections to. The predetermined format may also include a set of parameters that the user has chosen for the particular configuration feature. The predetermined format further may include the configuration set up questions that are presented by the driver 154 for this particular configuration feature. The predetermined format may also include the answers or selections to those configurations set up questions and need not contain all of the possible configuration set up questions originally presented to the user for the particular configuration feature. The format may contain only the answers or the selections associated with the configuration set up questions that the user has made any changes to.

Continuing with FIG. 1B, in one example, as the preboot interpreter 122 communicates the user's selections to the driver in the predetermined format, the user's selections are passed from the preboot interpreter 122 to the driver 154 through the transfer buffer 164. Upon receiving of the configuration selections in the predetermined format, the driver 154 parses the data, which has the configuration selections, made by the user. The driver 154 then performs the necessary functions such as issuing a command specific to the card 104 that is required for a particular operational code to enact a particular configuration feature.

In another example, the driver 154 retrieves and interprets the data, which has been passed to it from the interpreter 122 via the transfer buffer 164. The driver 154 then makes the necessary changes to the configuration feature of the card 104 as per the user's selections. Upon completion of the configuration change, the driver 154 may pass the new configuration setting information back to the preboot interpreter 122, also through the transfer buffer 164. The driver 154 may instruct the preboot interpreter 122 to present the new configuration data to the user. The preboot interpreter 122 may then repeat the routine of placing the configuration data into the buffer 130; and if needed, present the new configuration data to the user using the homepage 124 as discussed above. Based on the information presented in the homepage 124, the user may make any additional adjustment or may simply accept the new configuration setting.

Under the configuration scheme shown in FIG. 1B, the user sees immediate changes in the hardware device, such as changes to the setting of the card 104, after the user makes the configuration selections. Furthermore, with the ability to immediately see the configuration setting for the device, the user may also retrieve the necessary configuration information from the device upon entering the user's selections. The configuration information may provide the user with an immediate knowledge of the configuration setting of the device so that the user may make any necessary adjustments or changes without needing to reboot or reset the computer system 101, or without needing to wait until the end of the preboot stage configuration to see the configuration changes. Moreover, in the event that there is an error in the configuration setting, the user will be able to see the data immediately as opposed to waiting for the end of the configuration set up session and reboot to view or to realize the error. The user thus gets an immediate gratification of the configuration changes that the user makes to the configurable device that is equipped with the callback operation.

In another example, when the configuration changes are ready to be committed, the interpreter 122 will store the configuration data to a storage location 126 just as mentioned above in FIG. 1A. The storage location 126 is preferably a non-volatile storage module or any storage module that is persistent, e.g., a non-volatile RAM.

In another exemplary embodiment, the configuration sessions occur during the runtime stage of the computer system 100. As for the configuration set up that occurs during the runtime stage, FIG. 1A illustrates that when the operating system is running, another interpreter, interpreter 128, locates the unified buffer 130 and carries out similar task as the interpreter 122 to present configuration setup menu to the user. The interpreter 128 can be referred to as a runtime interpreter. In essence, the interpreter 128 is also a set of instructions, codes, or software that can carry out tasks similar to the interpreter 122. The interpreter 128, however, typically resides in the operating system of the computer system 100 and performs the tasks performed by the preboot interpreter 122, except that the interpreter 128 does so during the runtime stage. Additionally, the interpreter 128 does not need to generate the homepage 124. Instead, the interpreter 128 only needs to read the homepage 124, presents the homepage 124 to the user upon request, and interprets the homepage 124 as necessary for the configuration sessions.

Continuing with FIG. 1A, similar to the interpreter 122, the interpreter 128 of this embodiment presents the homepage 124 to the user when the user indicates the desire to configure the computer system 100 and other devices populating the computer system 100, during the runtime stage. In one example, the user indicates the desire to configure by entering some commands during the runtime stage. The user may hit a function key on a conventional keyboard (e.g., F1, F2, or F3) that will command the interpreter 128 to present the homepage 124 to the user for configuration setup. Alternatively, the operating system can be setup so that the interpreter 128 can present a configuration option to the user through a conventional control panel such as the control panel currently used in the Windows operating system. The user may perform an overt act that executes the interpreter 128. For example, an icon can be installed in the control panel to provide a manner where the user can execute the interpreter 128. As the user clicks on the icon with a conventional mouse or otherwise chooses the icon, the interpreter 128 is launched and the runtime configuration may begin.

The homepage that is being presented to the user for configuration setup during runtime is preferably the same homepage 124 created by the interpreter 122 to give the user the uniform configuration experience. In one example, the interpreter 128 is programmed to look for the GUID that is installed in the unified buffer 130 as mentioned above and uses the pointer pair associating with the GUID to retrieve the configuration data for the devices. Based on the information that the interpreter 128 is able to locate and interpret from the unified buffer 130, the interpreter 128 then presents to the user the appropriate setup related questions using the homepage 124. In one example, the interpreter 128 finds all occurrences of the configuration setup information that have been exported to the unified buffer 130. The interpreter 128 interprets the codings or the operational codes correlating to the configuration setup information for each of the devices and dynamically creates an encoding to represent the homepage 124 which lists to the user all of the items in the computer system which have exported configuration setup information.

The unified buffer 130 will also lead the interpreter 128 to the homepage 124 generated based on the content of the unified buffer 130. In the example where the homepage 124 is placed in the same place as the unified buffer 130 (or within the unified buffer 130) the runtime interpreter 128 looks for the GUID to find the unified buffer 130 from which the runtime interpreter 128 can locate the homepage 124 to read. In the example where the homepage 124 is not in the same location as the unified buffer 130, the runtime interpreter 128 must be able to know the GUID that identifies the location of the homepage 124 or that the preboot interpreter 122 must provide an indication of this location.

In one example the answer selections are presented for the user to choose for each question pertaining to configuration setup just as in the preboot stage configuration sessions discussed above. The user will make adjustments to the devices by choosing one of the selections or choices from the configuration menu as mentioned above.

In one exemplary embodiment, the runtime stage configuration sessions involve the callback operation discussed above. Turning to FIG. 1B, as mentioned above, anyone of the configurable devices could be set up with the callback operation that enable dynamic configurations to this device, for example, the card 104. When the device is set up to include the callback operation, the device's driver includes instructions that indicate that the device involves a callback operation for the configuration sessions.

In the embodiment with the runtime stage configuration, the homepage 124 presents the user with an interface with configuration menu for each of the configurable device and the system motherboard through which the user can make configuration changes. In one example, when the user makes adjustments to the configurable device that is enabled with the callback option, (e.g., the card 104 which has the callback operation type item "A"), the runtime interpreter 128 recognizes that these adjustments to the configuration device involve the callback instructions. The adjustments to the configuration device are selections from the configuration menu for the device that has been flagged with an indication that the adjustments are the types that involve the callback instructions. The set of callback instructions is typically present in the operational code associated with the configuration menu of the card 104. In one example, the runtime interpreter 128 interprets the callback instructions.

The runtime interpreter 128 performs similar function to the preboot interpreter 122 discussed above except that it does so within a runtime stage (e.g., within an operating system environment). For example, the runtime interpreter 128 follows the set of instructions to collect the user's selections and communicate the selections back to the driver.

In another example, the runtime interpreter 128 communicates the user's selections to the driver in the predetermined format as mentioned above. The predetermine format needs to include an identification of a particular configuration set up feature that the user has chosen to change or to submit selections to. The predetermined format may also include a set of parameters that the user has chosen for the particular configuration feature. The predetermined format further may include the configuration set up questions that are presented by the driver 154 for this particular configuration feature. The predetermined format may also include the answers or selections to those configurations set up questions. The predetermined format need not contain all of the possible configuration set up questions originally presented to the user for the particular configuration feature as mentioned above.

In one example, the user's selections are passed from the runtime interpreter 128 to the driver 154 through the transfer buffer 164. Upon receiving of the configuration selections in the predetermined format, the driver 154 parses or interprets the data that has the configuration selections made by the user. The driver 154 then performs the necessary functions such as issuing a command specific to the card 104 that is required for a particular operational code to enact a particular configuration feature as per the user's selections.

Upon completion of the configuration change, the driver 154 may pass the new configuration setting information back to the runtime interpreter 128, also through the transfer buffer 164. The driver 154 may instruct the runtime interpreter 128 to present the new configuration data to the user. The runtime interpreter 128 may then repeat the routine of placing the configuration data into the buffer 130; and if needed, present the new configuration data to the user using the homepage 124 as discussed above. Based on the information presented in the homepage 124, the user may make any additional adjustment or may simply accept the new configuration setting. Under the runtime stage configuration scheme shown in FIG. 1B, the user sees immediate changes to the hardware devices thus any necessary correction or adjustment during the runtime stage can easily be done.

In another example, when the configuration changes are ready to be committed, the interpreter 122 will store the configuration data to a storage location 126. In one example, the storage location 126 has appropriate allocation for each of the configuration data set for each of the devices as shown in FIG. 1B. The storage location 126 may have the same setup as the unified buffer 130. In one example, the preboot interpreter 122 and the runtime interpreter 128 know where to store the data, such that the device can locate them. In this example, each device is allocated a predetermined space in the storage location 126. The specific driver for each device will have expectation of where or know where to look for its corresponding configuration data in the storage location 126 and as such each driver will go to that location to read the configuration data for its corresponding device.

In one exemplary embodiment, the configuration data remains in the storage location 126 until when computer system is rebooted or reset as is normally needed to enact a configuration change in the system setup, especially for those configurable devices that are not enabled with the callback operation. During reboot, the devices (e.g., the cards 104, 106, 108, 110, and the motherboard 102) retrieve the configuration data from the storage location 126. Each corresponding driver for each of the devices will check the storage location 126 to determine what the user has selected (if anything) and setup the device accordingly. In one example, each of the drivers is responsible for enacting the selections or choices that the user made using conventional methods. The devices then use the configuration data to setup the devices according to the user's selections using conventional methods before the computer system goes into the runtime stage where the operating system controls the computer system.

The exemplary embodiments described above reduce the need for creating setup applications that are usable solely in a particular operating system such as Microsoft Windows. The mechanisms of the exemplary embodiments allow for a generic mechanism to provide setup information to most operating system. Furthermore, the embodiments lower the cost of making hardware and devices by off-loading manufacturers and developers' task by not requiring the manufacturers and developers to create additional and separate set of instructions to enable configuration during runtime stage in any particular operating system.

FIGS. 2 and 3A–3D illustrate exemplary methods of configuring a machine such as the computer system 100 or the computer system 101 described above such that configuration sessions can occur during the preboot stage or during the runtime stage, and the user can dynamically interact with the configurable devices populating the machine during the configuration sessions.

Figure 2:
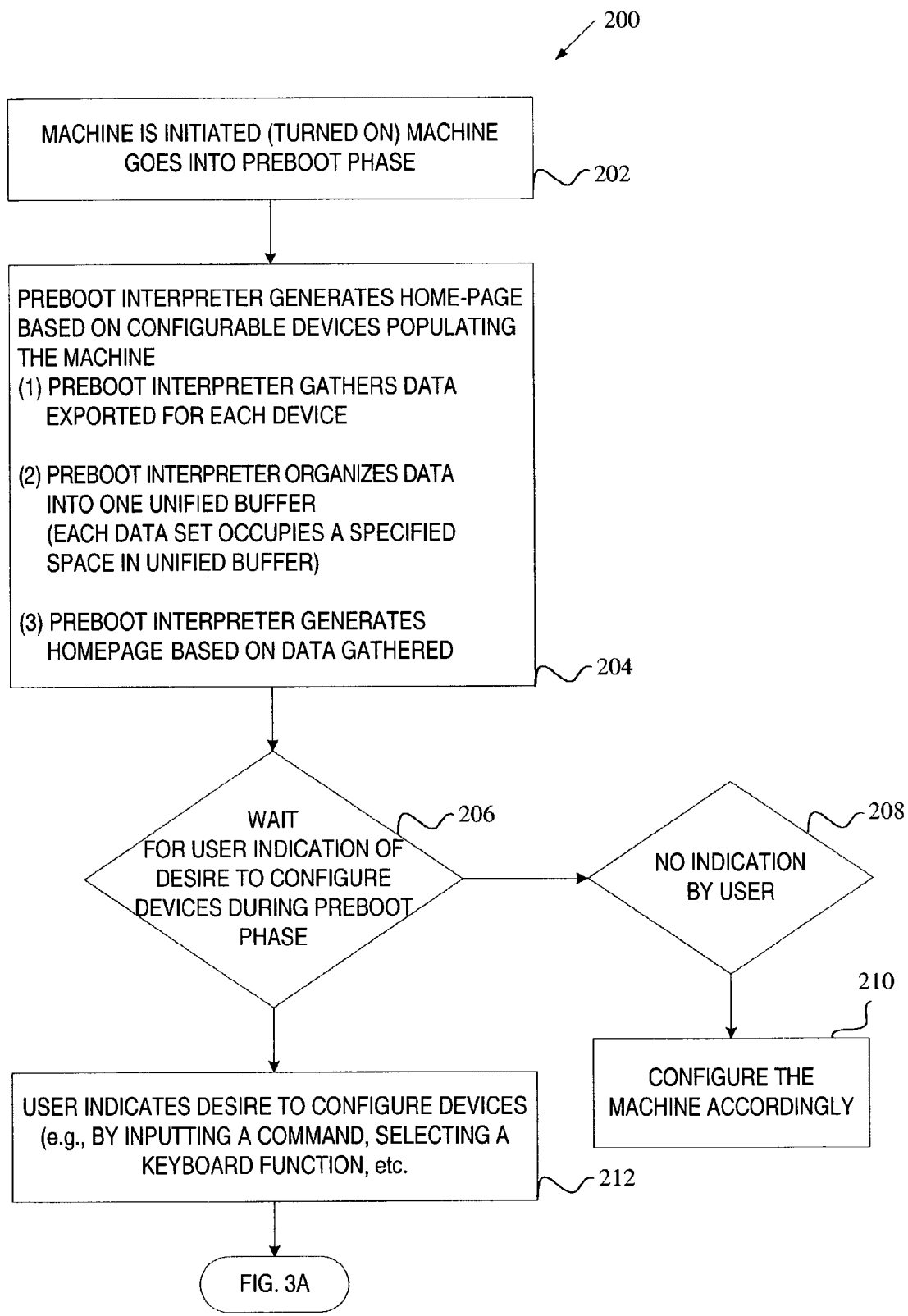
FIG. 2 illustrates an exemplary method of configuring a computer system.

As illustrated in FIG. 2, in method 200, at operation 202, the machine is initiated or turned on. After all of the necessary conventional self-tests, the machine enters preboot or booting up stage or phase. At operation 204, a preboot interpreter generates a homepage based on the configurable devices populating the machine. The preboot interpreter first gathers all of the configuration data that have been exported from each of the configurable devices including the motherboard system. The preboot interpreter then collects and organizes the configuration data into one unified buffer. The preboot interpreter also allocates a particular space in the unified buffer to each of the configuration data set corresponding to each of the devices. The preboot interpreter then generates the homepage containing configuration menus for all of the appropriate devices based on the configuration data.

At operation 206, during the preboot/booting up phase the machines waits for the user to indicate the desire to configure the machine and the configurable devices. If there is no indication for such desire to configure the machine (e.g., through using a conventional input/output device) during the preboot/booting up phase, as shown in the operation 208, the preboot interpreter uses the configuration data that have been exported and configure the machine using conventional methods (operation 210). If there is an indication for the user's desire to configure the machine during the preboot/booting up phase, the configuration is performed according to the method 300 illustrated in FIG. 3A.

Figure 3A:
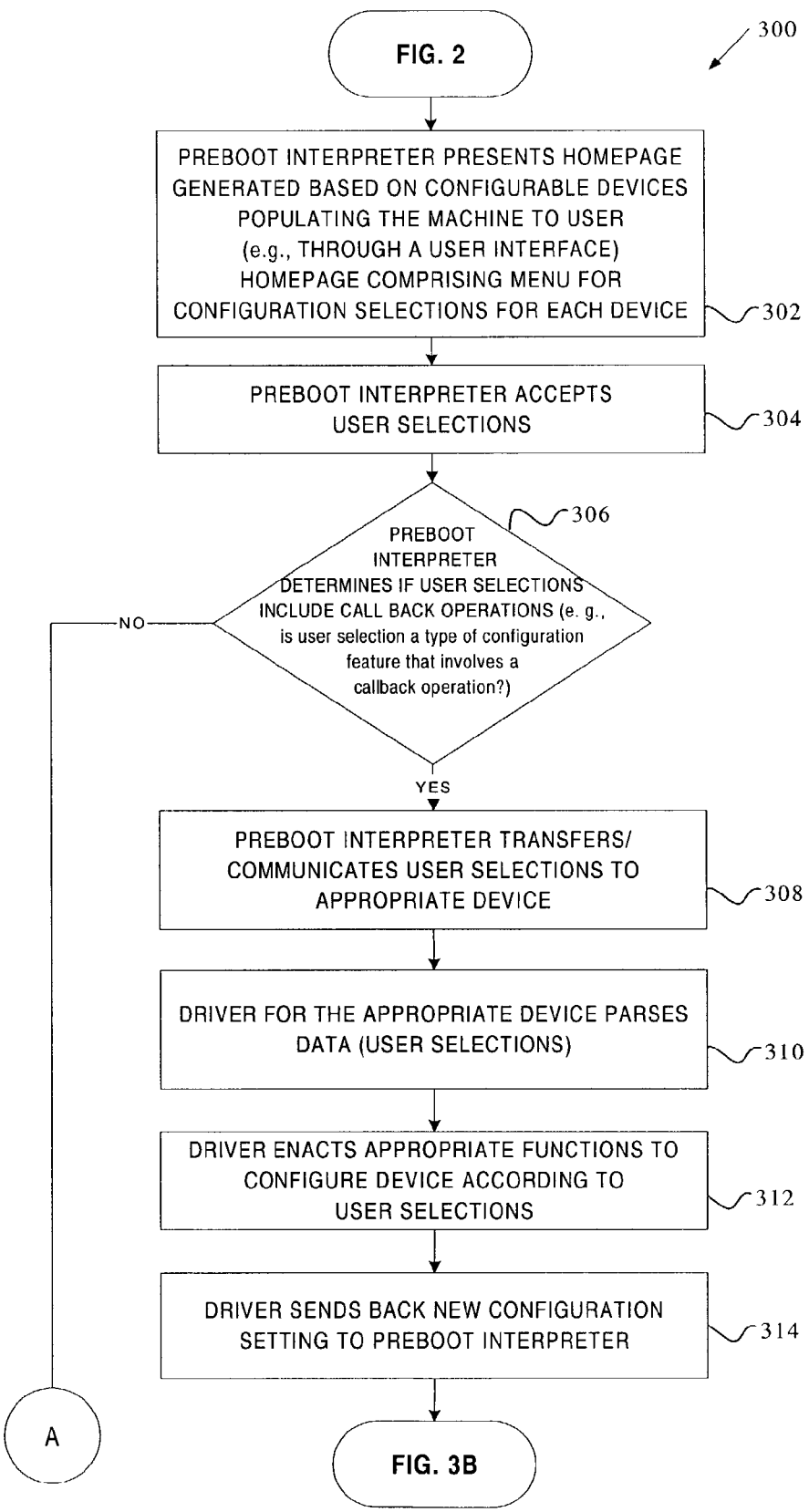
FIGS. 3A–3B illustrates another exemplary method of configuring a computer system that enables dynamic interactions.

Continuing to FIG. 3A, at operation 302, the preboot interpreter presents the homepage generated based on the configurable devices populating the machine as mentioned above to the user. The homepage acts as a user interface to present the user with options or selections pertaining to configuration setup for the devices. The homepage comprises configuration menu for all of the configurable devices that have exported configuration data into the unified buffer where the user can set or choose the desirable setup for each device.

At operation 304, the preboot interpreter accepts the user selections. At operation 306, the preboot interpreter determines if the user selections include callback operations (e.g., "is the particular user selection a type of configuration feature that involves a callback operation?") If the answer to the determination is "Yes," the preboot interpreter transfers or otherwise communicates the user selections to the appropriate device at operation 308. At operation 310, the driver for the appropriate device parses or interprets the configuration data containing the user selections. At operation 312, the driver for this device enacts or executes appropriate functions to configure the device according to the user selections. At operation 314, the driver sends data containing the new configuration setting to the preboot interpreter.

Figure 3B:
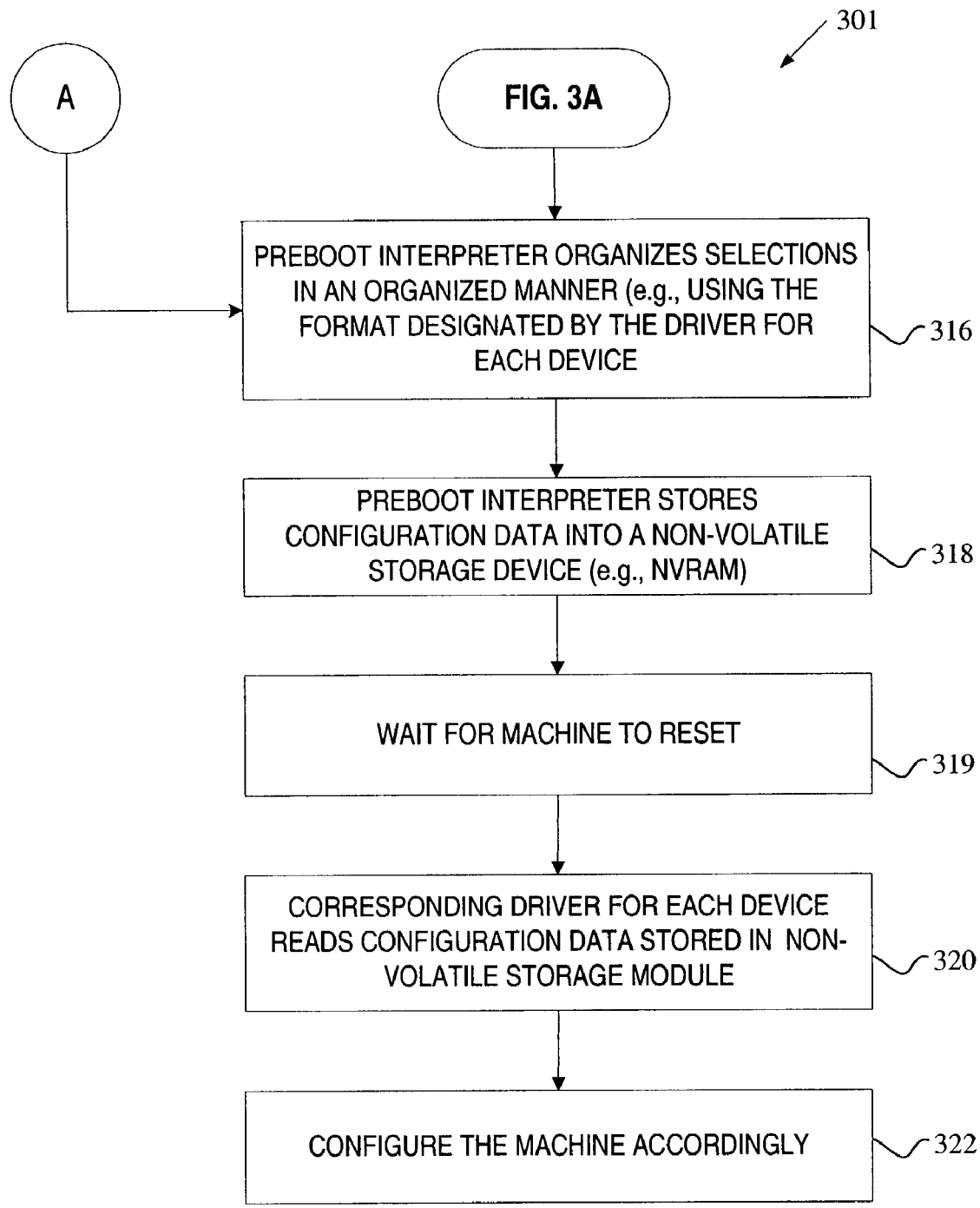

Then, continuing to FIG. 3B, when the preboot interpreter receives the new configuration setting in this data, the preboot interpreter organizes the selection into a manner that the drivers for the devices can recognize at operation 316. At operation 318, the preboot interpreter stores the configuration data into a storage location that is nonvolatile, for example, a NVRAM. At operation 319, the machine waits for a reboot or a reset.

At operation 320, after the machine is reset, the corresponding driver for each device reads the configuration data stored in the storage location. In one example, the devices have corresponding drivers that know how to get to the storage location and retrieve the configuration data. At operation 322, the machine and the devices populating the machine are configured according to the configuration data retrieved from the storage location.

If the determination at operation 306 above is "No," the preboot interpreter organizes the selection into a manner that the drivers for the devices can recognize at operation 316. And, operation 318, 319, 320, and 322 discussed above are performed.

Figure 3C:
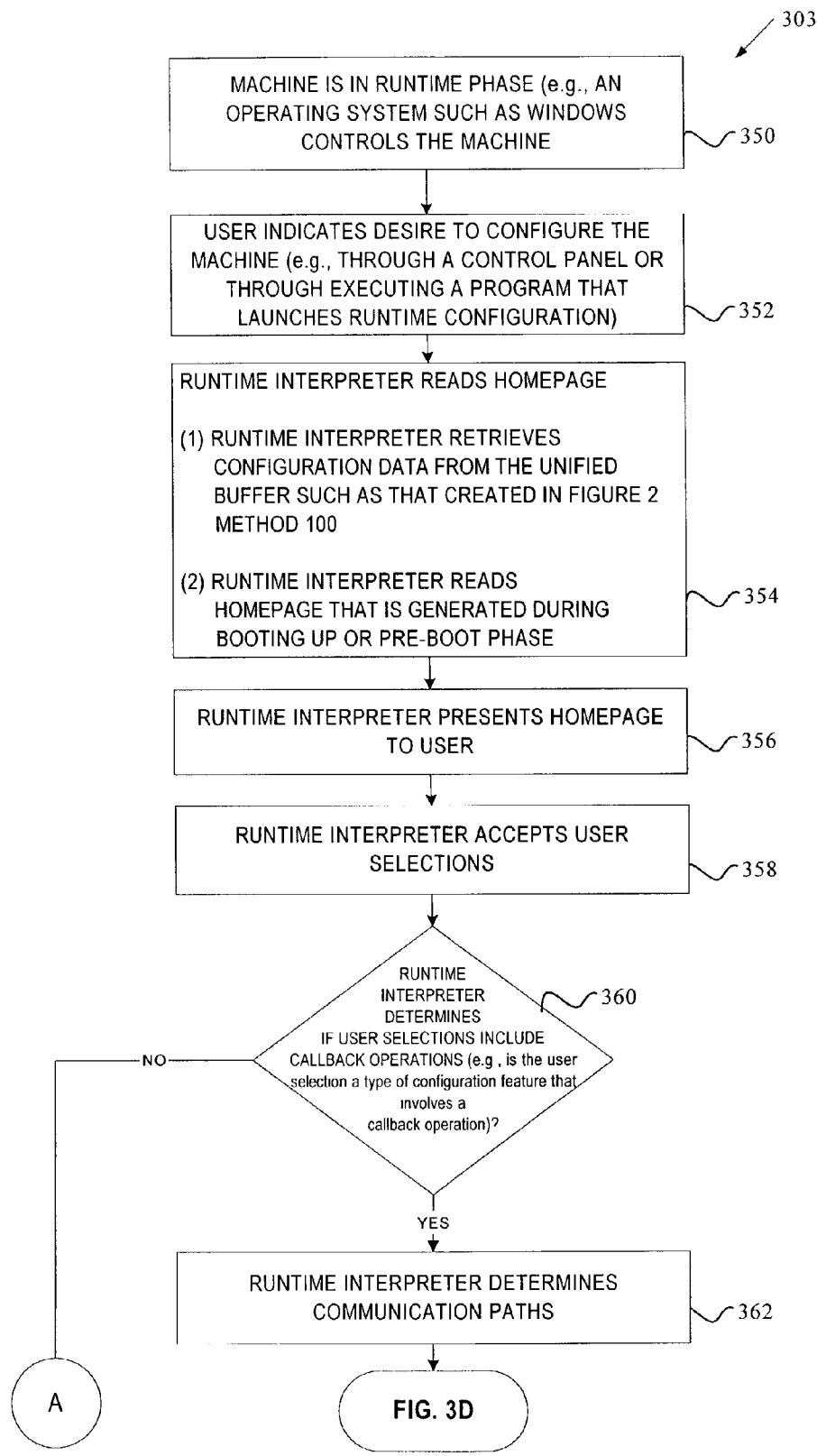
FIGS. 3C–D illustrates yet another exemplary method of configuring a computer system that enables dynamic interactions.
Figure 3D:
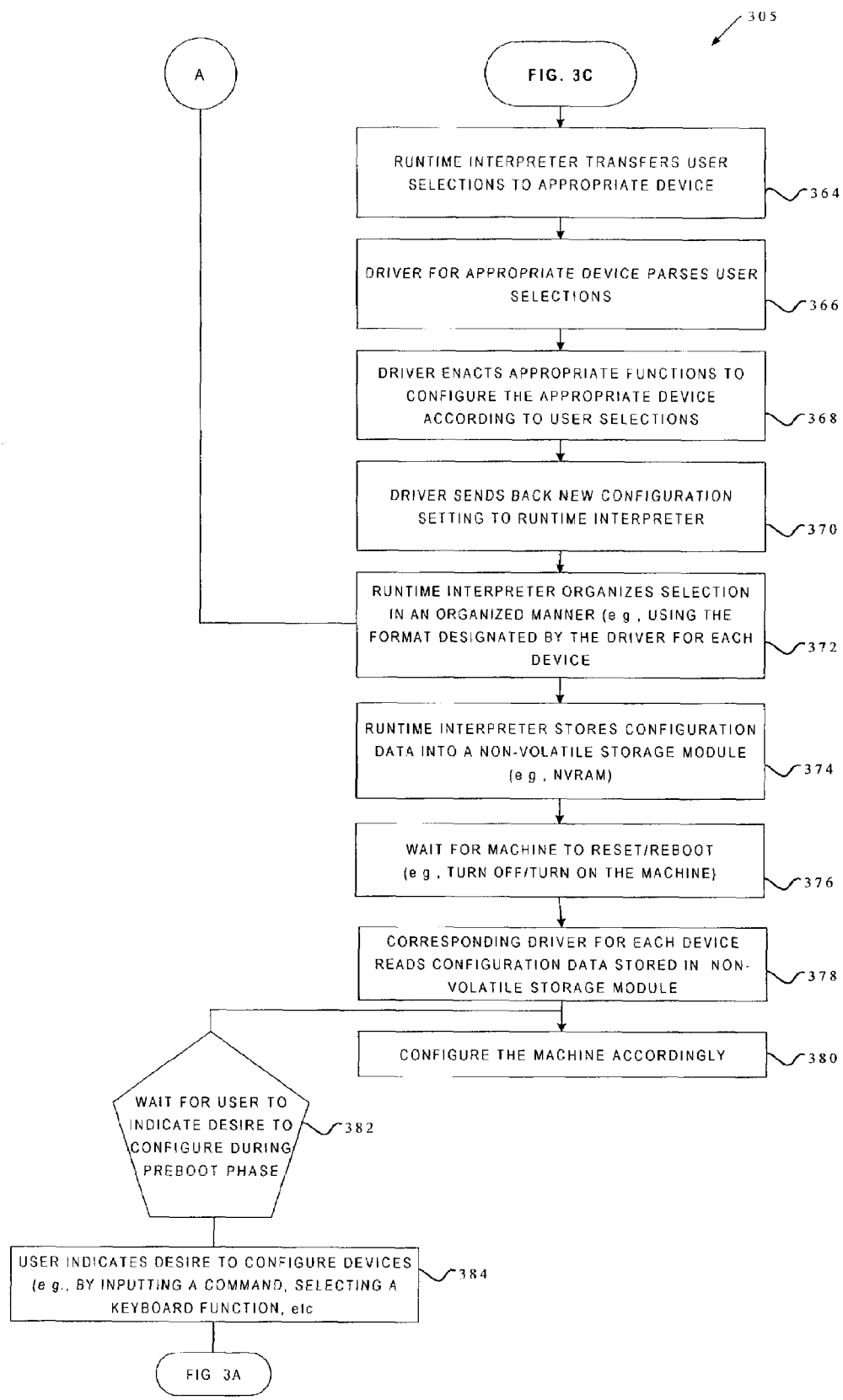

Turning now to FIG. 3C, a method 303 as shown in FIG. 3B illustrates an exemplary method of configuring the machine while in the runtime stage or phase. At operation 350, the machine is in the runtime phase, for example, when the operating system of the machine such as Windows is controlling the machine. At operation 352, the user indicates a desire to configure the machine, e.g., by selecting an option presented to the user in a control panel.

At operation 354, a runtime interpreter generates a homepage based on the configurable devices populating the machine similar to operation 204 above. At operation 356, the runtime interpreter presents the homepage to the user using for example, an interface allowed through the operating system of the machine. At operation 358, the runtime interpreter accepts the user selections. At operation 360, the runtime interpreter determines if the user selections include callback operations similar to operation 306 above.

If the answer to the inquiry is "Yes," the runtime interpreter determines the communication path to communicate the user selections to the appropriate device at operation 362. Continuing to FIG. 3D, at operation 364, the runtime interpreter transfers or otherwise communicates the user selections to the appropriate device. At operation 366, the driver for the appropriate device parses or interprets the configuration data containing the user selections. At operation 368, the driver for this device enacts or executes appropriate functions to configure the device according to the user selections. At operation 370, the driver sends data containing the new configuration setting to the runtime interpreter. When the runtime interpreter receives the new configuration setting in this data, the runtime interpreter organizes the selection into a manner that the drivers for the devices can recognize at operation 372. At operation 374, the runtime interpreter stores the configuration data into a storage location that is nonvolatile, for example, a NVRAM. At operation 376, the machine continues with normal operations and waits for the reset or reboot of the machine to enact the configuration changes, if any.

At operation 378, after the machine is reset, the corresponding driver for each device reads the configuration data stored in the storage location. In one example, the devices have corresponding drivers that know how to get to the storage location and retrieve the configuration data. And, at operation 380, the machine and the devices populating the machine are configured according to the configuration data retrieved from the storage location.

If the determination at operation 360 above is "No," the runtime interpreter organizes the selection into a manner that the drivers for the devices can recognize at operation 372. And, operation 374, 376, 378, and 380 discussed above are performed.

During the booting up (or preboot) phase, the machine may wait for the user to indicate desire to configure the machine during the booting up phase as shown in operation 382. If the user indicates desire to configure the machine during this booting up phase, as shown in operation 384, the method 300 described in FIG. 3A is repeated. And, if there is no user indication of configuring during this booting up phase, the machine and the devices populating the machine are configured according to the configuration data that are retrieved from the storage location as shown in operation 380.

As mentioned above, some of the exemplary embodiments can be applied to a system such as the computer system 400 shown in FIG. 4. As shown in FIG. 4, the computer system 400, which is a form of a data processing system, includes a bus 402, which is coupled to a processor or a microprocessor 403, a ROM 407, a volatile RAM 405, and a non-volatile memory 406. The processor 403, which may be a Pentium microprocessor from Intel Corporation, is further coupled to a cache memory 404 as shown in the example of FIG. 4. The bus 402 interconnects these various components (e.g., the processor 403, the ROM 407, the volatile RAM 405, and the non-volatile 406) together. The bus 402 further interconnects these various components to a display controller and a display device 408 (e.g., a liquid crystal display (LCD), a flat panel display, or a cathode ray tube (CRT)). The bus 402 yet further interconnects these various components to peripheral devices 410 such as input/output (I/O) devices, which may be mice, keyboards, modems, network interfaces, printers, and other devices, which are well known in the art. Typically, the I/O devices are coupled to the computer system 400 through an I/O controller 409. The volatile RAM 405 is typically implemented as a dynamic RAM (DRAM), which requires power continuously in order to refresh or maintain the data in the memory. The non-volatile memory 406 is typically a magnetic hard drive, a magnetic optical drive, an optical driver, a DVD RAM, or other type of memory system, which maintains data even after power is removed from the computer system 400. Typically, the non-volatile memory 406 will also be a random access memory, although this is not required. While FIG. 4 shows that the non-volatile memory 406 is a local device coupled directly to the rest of the components in the computer system 400, it will be appreciated that the non-volatile memory 406 can be non-volatile memory that is remote from the computer system 400, such as a network storage device which is coupled to the data processing system through a network interface such as a modem or an Ethernet interface. The bus 402 may include one or more buses connected to each other through various bridge, controller, and/or adapters, as is well known in the art. In one embodiment, the I/O controller 409 includes a Universal Serial Bus (USB) adapted for controlling USB peripheral devices.

The routines or set of instructions described herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the exemplary embodiments below are not described with reference to any particular programming language. It will be appreciated that a variety of programming languages may be used to implement the embodiments as described herein.

While the invention has been described in terms of several embodiments, those skilled in the art will recognize that the invention is not limited to the embodiments described but can be practiced with modification and alteration within the spirit and scope of the appended claims. The description is thus to be regarded as illustrative instead of limiting.

We claim:

1. A system comprising:
a configurable device;
a processor, coupled to said configurable device; and
a memory, coupled to said processor, having stored therein a first set instructions which when executed causes said processor
to retrieve configuration information for said configurable device from a buffer, said configuration information being resident in said buffer during a preboot stage of said computer system wherein a device driver for said configurable device exports a set of said configuration information that includes information enabling a callback operation to said device driver, which enables an operator to dynamically interact with said configurable device,
to generate and present a homepage to said operator, said homepage being generated based on said configuration information in said buffer and further includes a configuration menu for said configurable device from which said operator can make configuration selections, and
to communicate configuration selections obtained via said homepage using said callback operation to said device driver to enact said configuration selections.

2. The system as in claim 1 wherein said first set instructions further causes said processor to retrieve configuration information for said configurable device from said buffer, generate and present said homepage to said operator, and communicate said configuration selections for said configurable device to said device driver to enact said configuration selections.

3. The system as in claim 2 wherein said first set instructions causes said processor to store said configuration selections for said configurable device in a nonvolatile storage module included within said system.

4. The system as in claim 3 wherein:
said first set of instruction further causes said processor to communicate said configuration selections for said configurable device to said device driver during said preboot stage; and
said memory further stores a second set of instruction which when executed causes said processor to communicate said configuration selections for said configurable device to said device driver during said runtime stage.

5. The system as in claim 4 wherein said device driver for said configurable device executes said configuration selections to change a configuration setting on said configurable device when said configuration selections is communicated to said device driver and wherein said device driver further communicates a new configuration setting to first set of instruction that reflects said configuration selections.

6. The method of claim 1, further comprising enacting the configuration selections by resetting the system, wherein the configuration selections are obtained via the homepage without using the callback operation.

7. A method of a computer system, comprising
retrieving configuration information for a plurality of configurable devices of the computer system from a buffer that retains the configuration information between a preboot stage and a runtime stage of the computer system,
generating a preboot interface based upon the configuration information stored in the buffer,
presenting the preboot interface to an operator at the computer system to permit the operator to make configuration selections for the plurality of configurable devices during the preboot stage,
generating a runtime interface based upon the configuration information stored in the buffer, and
presenting the runtime interface to an operator at the computer to permit the operator to make configuration selections for the plurality of configurable devices during the runtime stage.

8. The method as in claim 7 further comprising:
collecting said configuration information for said plurality of configurable devices into temporary buffer locations; and
organizing said configuration information into said buffer.

9. The method as in claim 7 wherein
said retrieving configuration information, said generating said preboot interface, and presenting said preboot interface, is performed by a first interpreter which operates during said preboot stage.

10. The method as in claim 9 further comprising:
transferring configuration information for a configurable device of the plurality of configurable devices to the buffer, wherein a device driver for the configurable device includes a set of instructions in said configuration information that provides directions of how to communicate said configuration selections for said configurable device to said device driver.

11. The method as in claim 10 further comprising:
transferring said configuration selections for said configurable device to said device driver in response to the first interpreter processing the set of instructions when said operator makes said configuration selections to a configuration setting to said configurable device during said preboot stage.

12. The method as in claim 9 wherein
said retrieving configuration information, said generating said runtime interface, and said presenting said runtime interface is performed by a second interpreter which operates during said runtime stage.

13. The method as in claim 12 further comprising:
transferring said configuration selections for said configurable device to said device driver in response to the second interpreter processing the set of instructions when said operator makes said configuration selections to a configuration setting to said configurable device during said runtime stage.

14. The method of claim 7, further comprising storing said configuration selections in a nonvolatile storage module of the computer system.

15. The method of claim 7, wherein
generating the preboot interface comprises generating the preboot interface to include configuration setup questions defined by the configuration information in the buffer, and
generating the runtime interface comprises generating the runtime interface to include the configuration setup question defined by the configuration information in the buffer.

16. The method of claim 7, further comprising
generating the preboot interface to include configuration setup questions defined by the configuration information in the buffer,
generating the runtime interface to include the configuration setup questions defined by the configuration information in the buffer,
accepting configuration setup answers to the configuration setup questions,
defining said configuration selections based upon said configuration setup answers, and
storing said configuration selections in a nonvolatile storage module of the computer system.

17. The method of claim 7, further comprising
transferring the configuration information for a configurable device of the plurality of configurable devices to the buffer, wherein a device driver for a configurable device exports the configuration information to the buffer such that configuration information associates a configuration selection for the configurable device with a callback operation of the device driver, and
invoking the callback operation of the device driver in response to the operator making the configuration selection associated with the callback operation.

18. The method of claim 17, wherein transferring said configuration information to the buffer occurs during the preboot stage.

19. A tangible machine readable medium to configure a device of a computer system, comprising
preboot code, that when executed by the computer system during a boot up stage, causes the computer system to transfer configuration information for the device to a buffer that persists between the boot up stage and a runtime stage of the computer system, to generate, based upon the configuration information, a preboot user interface to change a configuration parameter of the device, and to present the preboot user interface to an operator at the computer system during the boot up stage, and
runtime code, that when executed by the computer system during a runtime stage, causes the computer system to retrieve the configuration information from the buffer, to generate, based upon the configuration information, a runtime user interface to change the configuration parameter of the device, and to present the runtime user interface to the operator at the computer system during the runtime stage.

20. The tangible machine readable medium of claim 19, wherein
the preboot code comprises a first interpreter to process the configuration information and to generate the preboot user interface during the preboot stage, and
the runtime code comprises a second interpreter to process the configuration information and to generate the runtime user interface during the runtime stage.

21. The tangible machine readable medium of claim 19, wherein
the configuration information comprises callback information provided by a device driver for the configurable device, said callback information associating configuration selections with callback operations of the device driver, and
the preboot code further causes the computer system to accept configuration selections from the operator at the computer system during the preboot stage and to invoke callback operations of the device driver based upon configuration selections accepted from the operator during the preboot stage.

22. The tangible machine readable medium of claim 21, wherein
the runtime code further causes the computer system to accept configuration selections from the operator at the computer system during the runtime stage and to invoke callback operations of the device driver based upon configuration selections accepted from the operator during the runtime stage.

* * * * *